I. KITSEE.
COLOR PHOTOGRAPHY.
APPLICATION FILED SEPT. 22, 1916. RENEWED FEB. 5, 1919.
1,298,514. Patented Mar. 25, 1919.
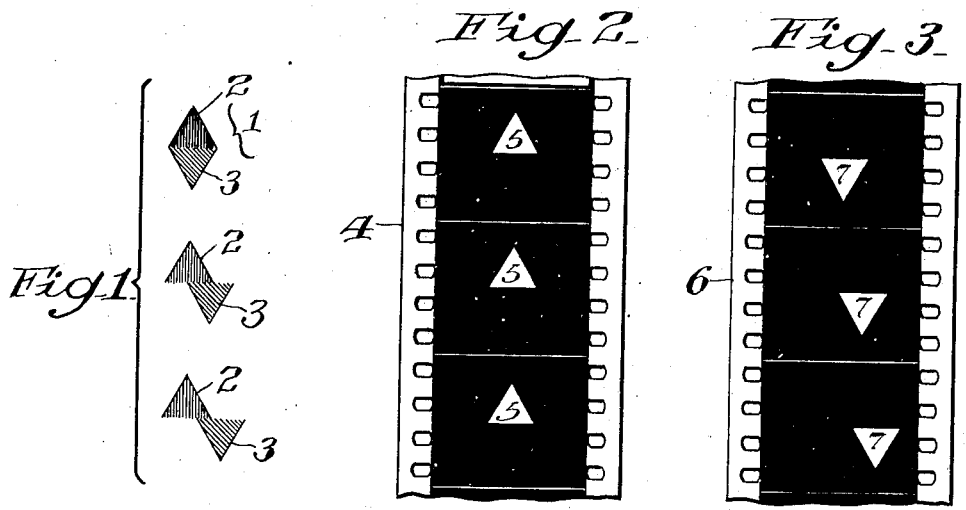
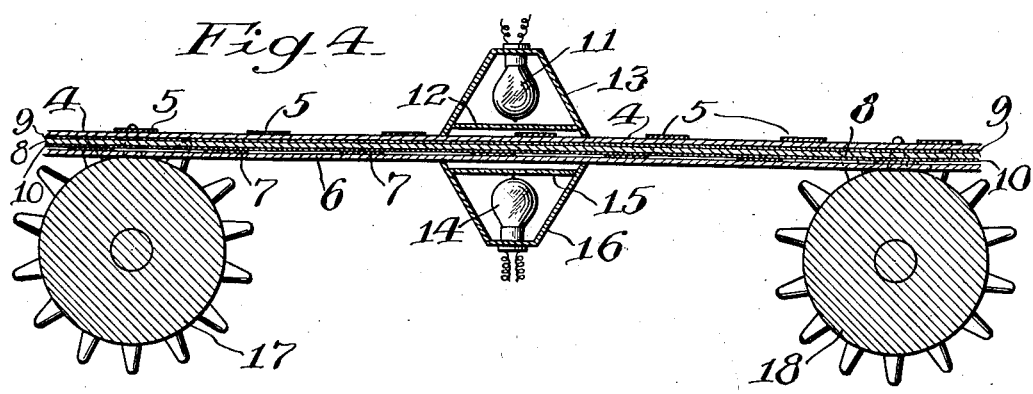
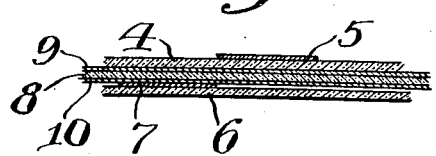
Witnesses
Inventor

UNITED STATES PATENT OFFICE.

ISIDOR KITSEE, OF PHILADELPHIA, PENNSYLVANIA.

COLOR PHOTOGRAPHY.

1,298,514.     Specification of Letters Patent.     Patented Mar. 25, 1919.

Application filed September 22, 1916, Serial No. 121,614. Renewed February 5, 1919. Serial No. 275,196.

*To all whom it may concern:*

Be it known that I, ISIDOR KITSEE, a citizen of the United States, residing at Philadelphia, in the county of Philadelphia and State of Pennsylvania, have invented certain new and useful Improvements in Color Photography, of which the following is a specification.

My invention relates to an improvement in color photography.

My invention may be practised with single blanks as well as with moving picture films and its object is to produce plates or films with the photographic images in their required color.

I will describe my invention as being practised on a moving picture film with the aid of a two color scheme, and I take it for granted that two negatives are produced of one and the same object, one negative through a green and a second negative through a red filter, and that these negatives are properly developed.

To be able to print from these negatives a positive at one operation I proceed in the following manner:—

A support, here a celluloid film, is sensitized on both sides with an emulsion of cromated gelatin film.

The gelatin emulsion for one surface is colored (if green and red is the color scheme) green and the gelatin for the second surface is colored red. To print with the aid of these two negatives on the sensitized film, one of the negatives say the one with the green color value, is placed on that surface of the sensitized film which is dyed red and the light is provided with a red filter or screen. The second of the negatives, here the negative with the red color value, is placed on the other or green surface of the sensitized film and the light rays are provided with a green filter or screen.

After the printing process is completed, the sensitized film is washed in the usual manner, whereby the gelatin, not acted upon by the light, is washed away.

I will state here that in such process, the gelatin remaining on the film will retain its color, as I have found that no matter how well the film has to be washed, the dye does not leave the gelatin acted upon by the light.

To illustrate some forms my invention may take I have reference to the accompanying drawing:—

In this drawing: Figure 1 is a diagrammatic view of an object supposingly to be moving and illustrating the same in three positions. Fig. 2 is a negative of these objects taken through a red filter or screen. Fig. 3 is a negative taken through a green filter or screen of one and the same object. Fig. 4 is a diagrammatic view with the films in section of my improved method of photographically printing from two negatives on one properly sensitized film. Fig. 5 is a sectional view of the two negatives and the sensitized film so as to show the different arrangement of the negatives as to the film.

In Fig. 1, 1 is the object to be photographed, 2 are the red and 3 the green parts.

In Fig. 2, 4 is the film, 5 the red color value images thereon.

In Fig. 3, 6 is the film, 7 the green color value images thereon.

The films 4 and 6 are properly sensitized and the photograph on the film of Fig. 2 is taken through a red filter or screen and the photograph on the film of Fig. 3 is taken through a green filter or screen. The two films are properly developed and are then made the mediums for photographically printing on a film sensitized on each surface with chromated gelatin.

In Fig. 4, 4 is the film as shown in Fig. 2 with the red color value images 5 thereon, 6 is the film as illustrated in Fig. 3 with the green color value images 7 thereon, 8 is the film, 9 and 10 are the two layers of chromated gelatin, 11 is a source of light, 12 the color screen or filter therefor, here as a green filter, 13 the housing for the light, 14 is a second source of light, 15 the color filter, here red, and 16 the housing for the light. The chromated gelatin 9 is here dyed green and the chromated gelatin 10 is here dyed red, 17 and 18 are means, such as sprocket wheels to move all three films in unison.

In Fig. 5, 4 is one of the negatives and 5 the image thereon, 6 is the second negative and 7 the image thereon, 8 the film and 9 and 10 the two layers of chromated gelatin thereon, dyed, as said above, one green and one red.

The operation was clearly indicated at the beginning of the specification:

The two negatives, one through a red and one through a green filter are preferably taken simultaneously either each through a different lens or through one lens with proper arrangements, so as to produce an equal distribution of light for both films.

I am aware, that in practice the demarcation of the different colors is not as sharp as illustrated here in this drawing, but as such condition does not affect my invention, it is unnecessary for me to enlarge thereon, and it is well known that the condition of the negative, as to the density of the photographed parts, depends to a great extent on the color density of the photographed object if a color screen is employed.

Having now described my invention what I claim as new and desire to secure by Letters Patent is:—

1. In color photography the method which consists in first providing a suitable support on both sides with films of colored chromated gelatin, the color of one of said films differing from the color of the second of said films and then printing simultaneously on both of said films through color filters identical with the color of said films.

2. In color photography the improvement which consists in providing two sides of a moving picture film with chromated gelatin, both of said gelatins colored, but the color of one of said gelatins different from the color of the second of said gelatins and then simultaneously printing from suitable photographs on each side of said film.

In testimony whereof I affix my signature in presence of two witnesses.

ISIDOR KITSEE.

Witnesses:
FRANCES RUTHERFORD,
ERNEST MILLER.